(12) United States Patent
Powell et al.

(10) Patent No.: US 9,777,631 B2
(45) Date of Patent: Oct. 3, 2017

(54) CONFORMAL INLET APPARATUS FOR A GAS TURBINE ENGINE

(75) Inventors: Brandon Flowers Powell, Cincinnati, OH (US); Trevor Andrew Tersmette, Cincinnati, OH (US); Craig Bradley Spencer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 13/251,139

(22) Filed: Sep. 30, 2011

(65) Prior Publication Data

US 2013/0081375 A1    Apr. 4, 2013

(51) Int. Cl.
*F02C 7/04* (2006.01)

(52) U.S. Cl.
CPC .............. *F02C 7/04* (2013.01); *Y02T 50/671* (2013.01); *Y10T 137/0536* (2015.04)

(58) Field of Classification Search
CPC .. F02C 7/04; F02C 7/042; F02C 7/045; Y10T 137/0536; Y10T 137/0645; Y02T 50/671
USPC .............. 60/226.1, 262, 796, 798; 29/889.2; 415/219.1, 220, 222, 228
See application file for complete search history.

(56) References Cited

U.S. PATENT DOCUMENTS

| | | | |
|---|---|---|---|
| 3,936,606 A * | 2/1976 | Wanke | 381/71.5 |
| 5,261,227 A | 11/1993 | Giffin, III | |
| 5,369,954 A * | 12/1994 | Stuart | 60/226.1 |
| 5,404,713 A | 4/1995 | Johnson | |
| 6,351,940 B1 | 3/2002 | Guinan et al. | |
| 6,948,317 B2 * | 9/2005 | Renggli et al. | 60/771 |
| 7,134,271 B2 * | 11/2006 | Baughman et al. | 60/226.1 |
| 7,216,475 B2 | 5/2007 | Johnson | |
| 7,395,657 B2 | 7/2008 | Johnson | |
| 7,713,020 B2 * | 5/2010 | Davidson et al. | 415/1 |
| 7,770,377 B2 * | 8/2010 | Rolt | 60/226.1 |
| 7,926,290 B2 | 4/2011 | Johnson | |
| 8,263,200 B2 | 9/2012 | Barber | |
| 2008/0053060 A1 * | 3/2008 | Olver | 60/226.1 |
| 2009/0226297 A1 | 9/2009 | Yanagi et al. | |
| 2010/0162680 A1 * | 7/2010 | Khalid | 60/204 |

(Continued)

FOREIGN PATENT DOCUMENTS

| | | |
|---|---|---|
| JP | 2001207911 A | 8/2001 |
| JP | 2009215895 A | 9/2009 |
| JP | 2010538195 A | 12/2010 |

OTHER PUBLICATIONS

CFM 56-3 Front view, wing mounted.*

(Continued)

*Primary Examiner* — Craig Kim
(74) *Attorney, Agent, or Firm* — Pamela A. Kachur

(57) ABSTRACT

An inlet apparatus for a gas turbine engine includes: a fan duct adapted to surround at least one row of rotating fan blades, the fan duct having a circular frontal area, and defining a first inlet plane; and an outer duct surrounding the fan duct, the outer duct including: a first frontal area shape at the first inlet plane which defines, cooperatively with an exterior of the fan duct, at least one lobe through which air can pass; and a second frontal area shape at a second inlet plane located axially downstream from the forward end which is circular, and which defines, cooperatively with an exterior of the fan duct, an annulus through which air can pass.

6 Claims, 5 Drawing Sheets

(56) References Cited

U.S. PATENT DOCUMENTS

2011/0120083 A1   5/2011   Giffin et al.

OTHER PUBLICATIONS

CFM 56-3 fan and core view.*
Unofficial English Translation of Chinese Office Action issued in connection with corresponding CN Application No. 201210368979.9 dated Jun. 24, 2015.
Unofficial English Translation of Japanese Office Action issued in connection with corresponding JP Application No. 2012-209037 dated Jun. 28, 2016.
Japanese Search Report issued in connection with corresponding JP Application No. 2012-209037 dated Jun. 16, 2016.

* cited by examiner

CONFORMAL INLET APPARATUS FOR A GAS TURBINE ENGINE

BACKGROUND OF THE INVENTION

This invention relates generally to gas turbine engines and more particularly to inlet ducts for such engines.

It is known to extract bleed air from an aircraft gas turbine engine to perform auxiliary functions such as flap blowing, boundary layer control, thrust vectoring, lift enhancement, and exhaust cooling in an aircraft. Such aircraft often require that the bleed air flow and pressure levels remain essentially constant, even though the engine thrust can vary over a band of about 20% to 100% of maximum, depending on the phase of flight.

One known method of supplying bleed air while maintaining thrust levels is to incorporate a "FLADE" stage (FLADE being an acronym for "fan on blade") in a conventional fan of a turbofan engine. Each blade of the FLADE stage includes an outer fan blade extending from the tip of a conventional fan blade. The outer fan blades are disposed within an outer duct that surrounds the conventional fan duct.

In prior art designs, co-annular circular ducts are used to supply air from the airframe integration plane ("AIP") of the engine to the FLADE stage inlet. In most cases, the FLADE fan is adjusted using variable inlet guide vanes ("IGVs") to maintain flow rates much less than the design maximum when the primary fan is running at its design maximum thrust level. The difference in operation between these components drives a larger inlet diameter than would be required with a conventional turbofan engine of the same total airflow size. In situations where a new vehicle is being designed, this larger diameter translates into overall vehicle size and cost. In situations where a fixed installation/airframe exists, this larger diameter can prevent the utilization of an engine with a FLADE fan stage.

If a circular inlet annulus constraint is enforced, the only remaining parameters that can be used to effect a similar diameter improvement would be a reduction in primary fan radius ratio or increase in fan design specific airflow. An increase in fan specific flow would significantly and negatively impact fan performance. A reduction in primary fan radius ratio would require a significant advance over state-of-the-art mechanical designs which are already in use.

Accordingly, there is a need for a gas turbine engine inlet apparatus which accommodates a FLADE stage within conventional size limitations.

BRIEF DESCRIPTION OF THE INVENTION

This need is addressed by the present invention, which provides an inlet apparatus for a gas turbine engine having a circular duct for a convention fan, surrounded by an outer duct that feeds a FLADE stage. The forward end of the outer duct is noncircular and defines lobes adapted to flow air to the FLADE stage while keeping the exterior dimensions the same as a conventional engine.

According to one aspect of the invention, an inlet apparatus for a gas turbine engine includes: a fan duct adapted to surround at least one row of rotating fan blades, the fan duct having a circular frontal area, and defining a first inlet plane; and an outer duct surrounding the fan duct The outer duct includes: a first frontal area shape at the first inlet plane which is noncircular and which defines, cooperatively with an exterior of the fan duct, at least one lobe through which air can pass; and a second frontal area shape at a second inlet plane located axially downstream from the forward end which is circular, and which defines, cooperatively with an exterior of the fan duct, an annulus through which air can pass.

According to another aspect of the invention, a gas turbine engine includes: a turbomachinery core operable to generate a flow of pressurized combustion gases; a low pressure turbomachinery spool operable to be driven by the core and including a fan disposed axially upstream of the core, the fan including at least one row of rotating fan blades; a fan duct surrounding the fan blades, the fan duct having a circular frontal area, and defining a first inlet plane; and a supplemental fan in the form of a ring of airfoils mechanically driven by the fan, and disposed in an outer duct that surrounds the fan duct. The outer duct includes: a first frontal area shape at the first inlet plane which defines, cooperatively with an exterior of the fan duct, at least one lobe through which air can pass into the outer duct; and a second frontal area shape at a second inlet plane located axially downstream from the first inlet plane which is circular and which defines, cooperatively with an exterior of the fan duct, an annulus through which air can pass to the supplemental fan.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
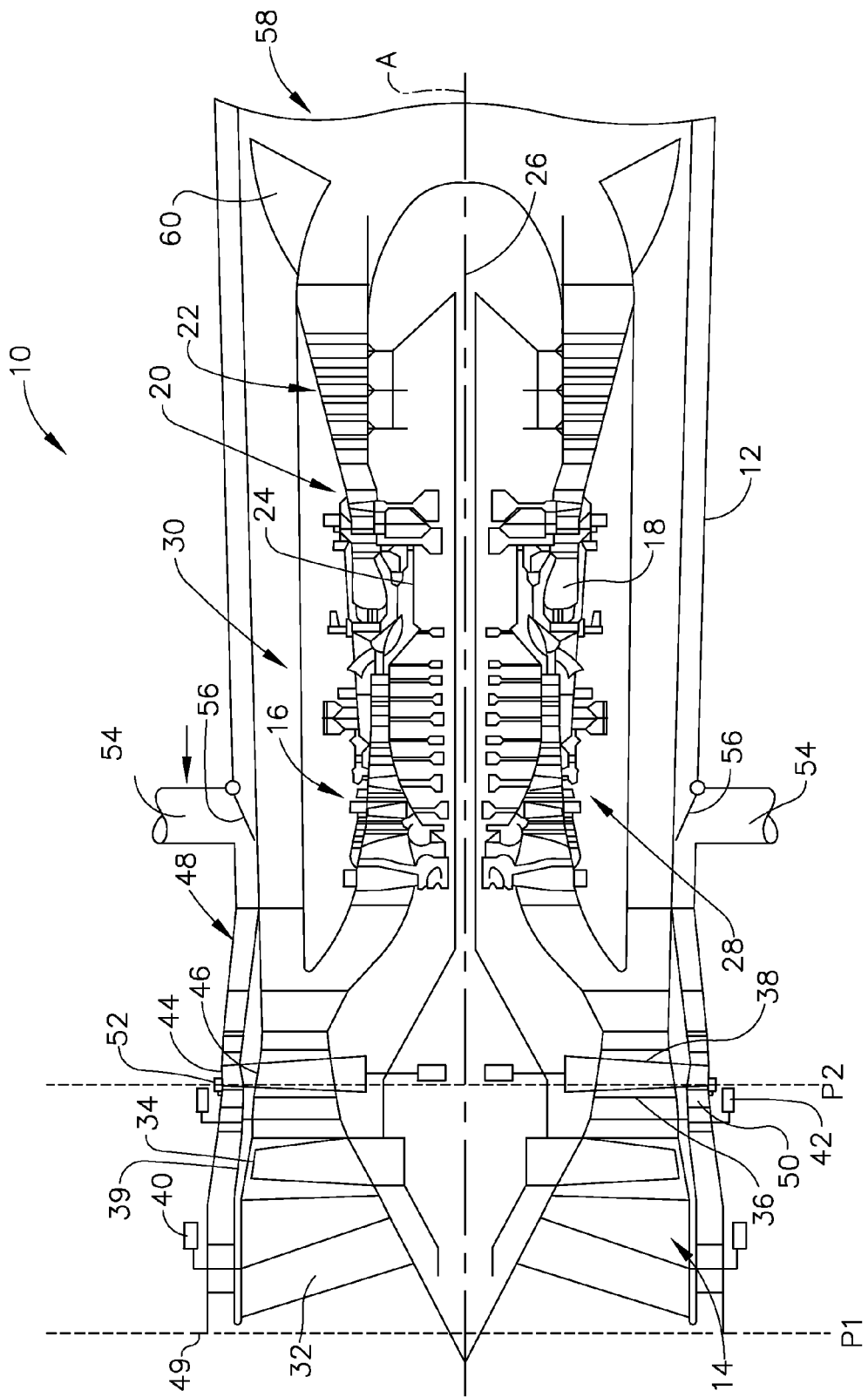
FIG. 1 is a schematic cross-sectional view of a gas turbine engine including an inlet apparatus constructed according to the present invention.
Figure 2:
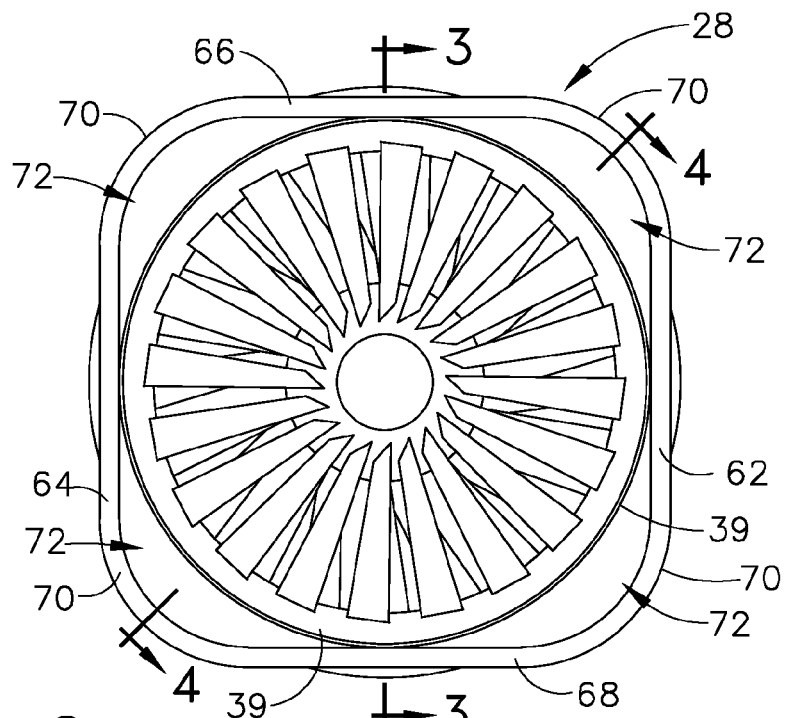
FIG. 2 is a front elevational view of a portion of the engine of FIG. 1.
Figure 3:
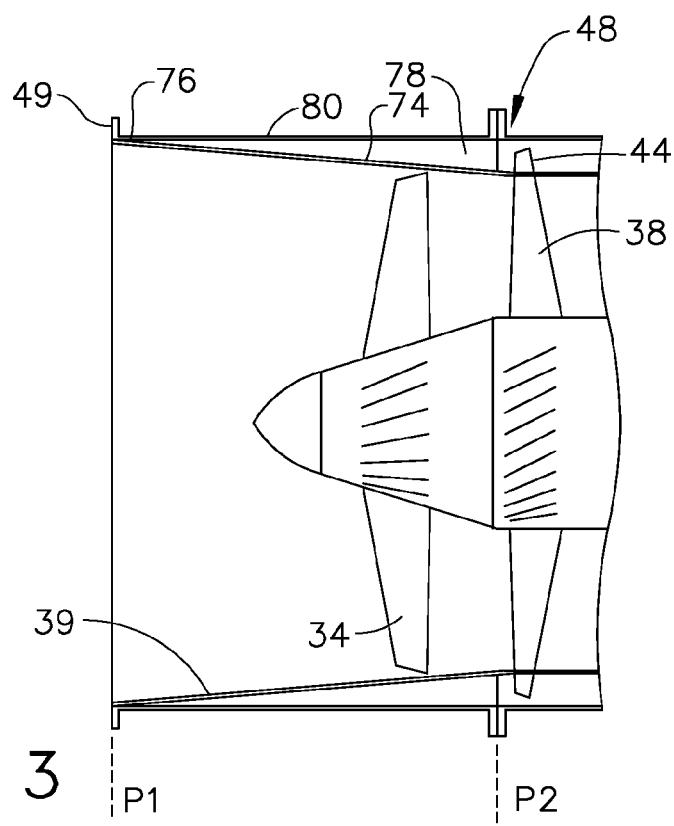
FIG. 3 is a cross-sectional view taken along lines 3-3 of FIG. 2.

Referring to the drawings wherein identical reference numerals denote the same elements throughout the various views, FIG. 1 illustrates a portion of an exemplary gas turbine engine, generally designated 10. The engine 10 has a longitudinal center line or axis A and an outer stationary annular casing 12 disposed concentrically about and coaxially along the axis A. The engine 10 has a fan 14, compressor 16, combustor 18, high pressure turbine 20, and low pressure turbine 22 arranged in serial flow relationship. In operation, pressurized air from the compressor 16 is mixed with fuel in the combustor 18 and ignited, thereby generating pressurized combustion gases. Some work is extracted from these gases by the high pressure turbine 20 which drives the compressor 16 via an outer shaft 24. The combustion gases then flow into the low pressure turbine 22, which drives the fan 14 via an inner shaft 26. The fan 14, inner shaft 26, and low pressure turbine 22 are collectively considered portions of a "low pressure spool" or "LP spool".

A portion of the fan discharge flows through the compressor 16, combustor 18, and high-pressure turbine 20, which are collectively referred to as the "core" 28 of the engine 10. Another portion of the fan discharge flows through an annular bypass duct 30 which surrounds the core 28. The illustrated fan 14 includes, in flow sequence, a row of non-rotating fan inlet guide vanes or "IGVs" 32, a first stage of rotating fan blades 34, a row of non-rotating interstage vanes 36, and a second stage of rotating fan blades 38. The rotating fan blades 34 and 38 are surrounded by a fan duct 39. In accordance with prior art practice, the fan duct 39 is circular in elevation view and closely circumscribes the tips of the fan blades 34 and 38 to minimize losses from airflow escaping past them during engine operation. The fan duct 39 may be a part of or integral to a conventional fan case. The forward end of the fan duct 39 defines a first inlet plane "P1" which coincides with the AIP as described above.

The inlet guide vanes 32 may have their angle of attack with respect to the airflow and their open flow area selectively changed by using an actuator 40 of a known type. Optionally, the interstage vanes 36 may have their angle of attack with respect to the airflow and their open flow area selectively changed by using an actuator 42 of a known type. Collectively, the fan IGVs 32 and the interstage vanes 36 are referred to as a fan stator assembly.

The engine 10 also includes a supplementary fan, referred to as a "FLADE" stage 44 in the form of a ring of airfoils extending radially outwardly from an annular shroud 46 and driven by the fan 14 (in this case the second stage 36). The FLADE stage 44 is positioned in an outer duct 48. A forward portion of the outer duct 48 surrounds the fan duct 39 and is described in more detail below. The FLADE stage 44 provides an additional flow stream at a different flow and pressure ratio that than of the fan 14. Other fan stage counts with possibly FLADE stages on more than one fan blade could also be used, depending on the final selection of fan and FLADE pressure ratios. The FLADE stage flow is sized to provide sufficient bleed air pressure and flow for a selected aircraft bleed-air powered system of a known type (not shown). A row of variable-angle FLADE inlet guide vanes 50, operated by an actuator 52, are moveable between open and closed positions to vary the flow through the FLADE stage 44.

The outer duct 48 includes one or more bleed air outlets 54 which direct flow to the aircraft bleed air system. Bleed air valves 56 may also be provided to selectively close off the bleed air outlets 54 and direct the FLADE stage flow downstream through the outer duct 48.

An exhaust duct 58 is disposed downstream of the core 28, and receives the mixed air flow from both the core 28 and the bypass duct 30. A mixer 60 (for example a lobed or chute-type mixer) is disposed at the juncture of the core 28 and bypass duct 30 flow streams to promote efficient mixing of the two streams. Optionally FLADE stage flow from the outer duct 48 may be mixed with the core or bypass flow streams.

The forward portion of the outer duct 48 will now be described in more detail with reference to FIGS. 2-5. As noted above, the outer duct 48 surrounds the fan duct 39. The outer duct 48 has a forward end 49 that coincides with the first inlet plane P1. A second inlet plane "P2" is defined axially downstream of the first inlet plane P1 and just upstream of the FLADE stage 44. While the present invention is described using an engine with a FLADE stage as an example, the principles of the present invention are equally applicable to other engine configurations with co-annular flow streams.

The frontal area shape of the forward end 49 of the outer duct 48 is significantly larger along at least one axis lying in the first inlet plane P1 than the frontal area shape of the forward end of the fan duct 39, while being constrained to approximately the same dimension as the fan duct 39 along at least one other axis lying in the first inlet plane P2. In the example shown in FIGS. 2-5, the outer duct 48 has a frontal area that is generally a square with convex radiused corners, the shape being defined by having opposed left and right edges 62 and 64, and opposed upper and lower edges 66 and 68, interconnected by convex bends 70. In the particular example illustrated, each of the edges 62, 64, 66, and 68 is tangent to the circular shape of the fan duct 39 at a single clock position, e.g., the 12 o'clock, 3 o'clock, 6 o'clock, and 9 o'clock locations. Accordingly, at those clock positions, the flow area of the forward end 49 of the outer duct 48 is zero. The open areas defined between the exterior of the fan duct 39 and each of the bends 70 represent lobes 72 through which air can flow. As an option, some open area could be provided around the entire periphery of the fan duct 39. In other words, the lobes 72 may be isolated from each other at the first inlet plane P1 or they may be interconnected to each other at the first inlet plane P1.

Figure 4:
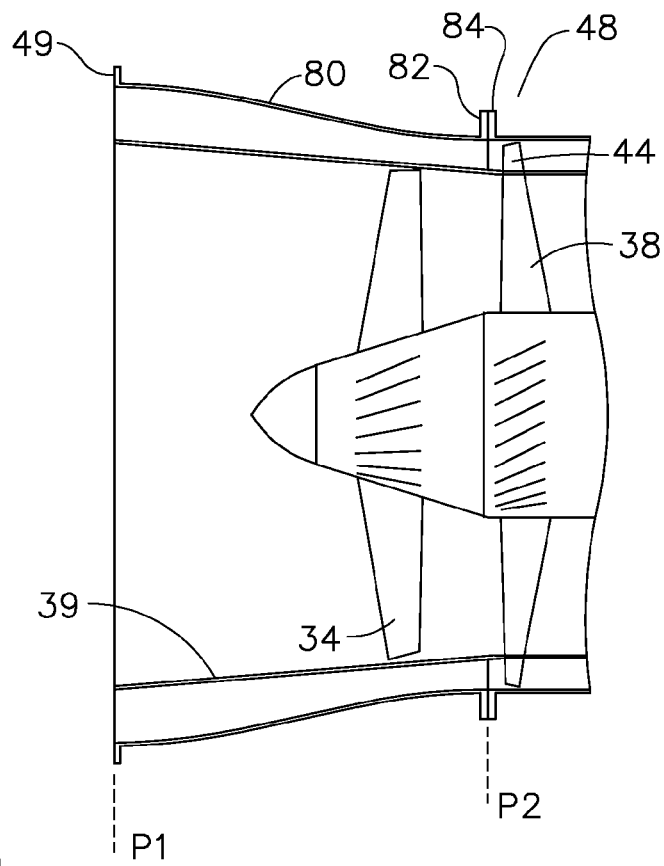
FIG. 4 is a cross-sectional view taken along lines 4-4 of FIG. 2.
Figure 5:
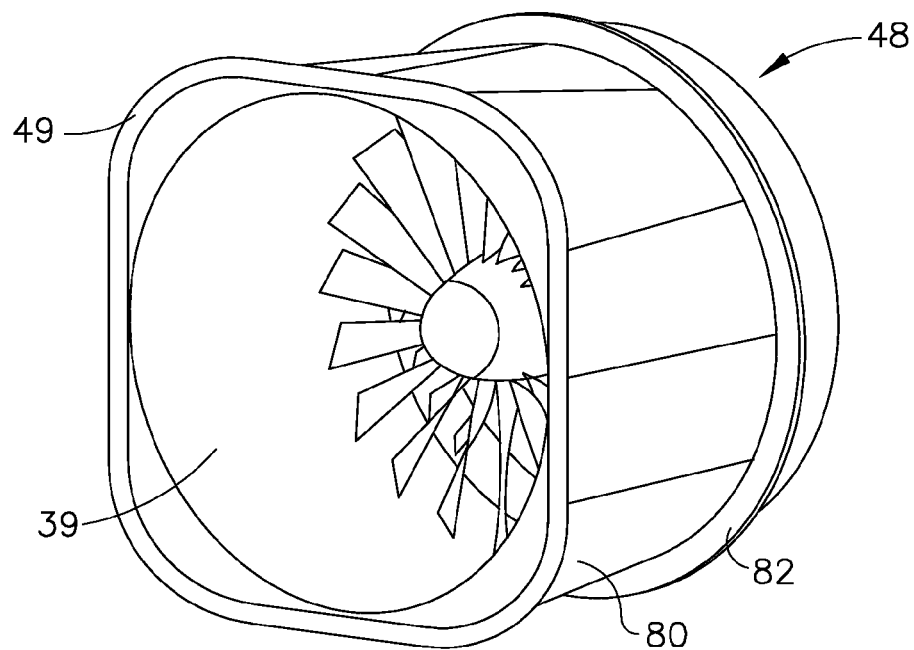
FIG. 5 is a perspective view of a portion of the engine show in FIG. 1.

At the second inlet plane P2, the frontal area of the outer duct 48 is circular in elevation view and closely circumscribes the tips of the blades the FLADE stage 44. Between the first inlet plane P1 and the second inlet plane P2, the outer duct 48 tapers and transitions from the forward end shape to the FLADE inlet shape, or in other words the lobes 72 gradually disappear moving axially front to back, blending into a circular shape so that an annulus is defined between the outer duct 48 and the fan duct 39 at the second inlet plane P2. This tapering is best seen in FIGS. 4 and 5. It is noted in particular that the transition from noncircular to circular takes place aft of the first inlet plane P1, and also that extra flow area needed for the FLADE stage flow can be provided while holding at least one dimension essentially the same as if the FLADE stage 44 were not present (i.e. the overall engine dimension at the first inlet plane P1 is increased over the fan duct 39 only by the wall thickness of the outer duct 48).

In the illustrated example, the forward portion of the outer duct 48 is defined by an inlet adapter 80. The inlet adapter 80 is a separate component which has a forward end coinciding with the first inlet plane P1, and an aft end including an annular, radially-outwardly-extending flange 82 so that it can be coupled to a mating flange 84 positioned at the forward end of the remainder of the outer duct 48. The flanges 82 and 84 may be permanently or removably joined to each other. As used herein, the term "permanently joined" implies apparatus and methods that are not ordinarily and reasonably intended to be separated during the normal life of the engine 10, for example welding or adhesive bonding. As used herein, the term "removably joined" implies apparatus and methods that are intended to be separated during the normal life of the engine 10 (for example threaded fasteners or a mechanical interlocking joint). The outer duct 48 is circular in elevation view at the joining plane between the inlet adapter 80 and the remainder of the outer duct 48. This configuration allows a single basic engine 10 to be mated to different airframe configurations without major changes to the configuration of the engine 10, by simply providing a different inlet adapter 80.

Figure 6:
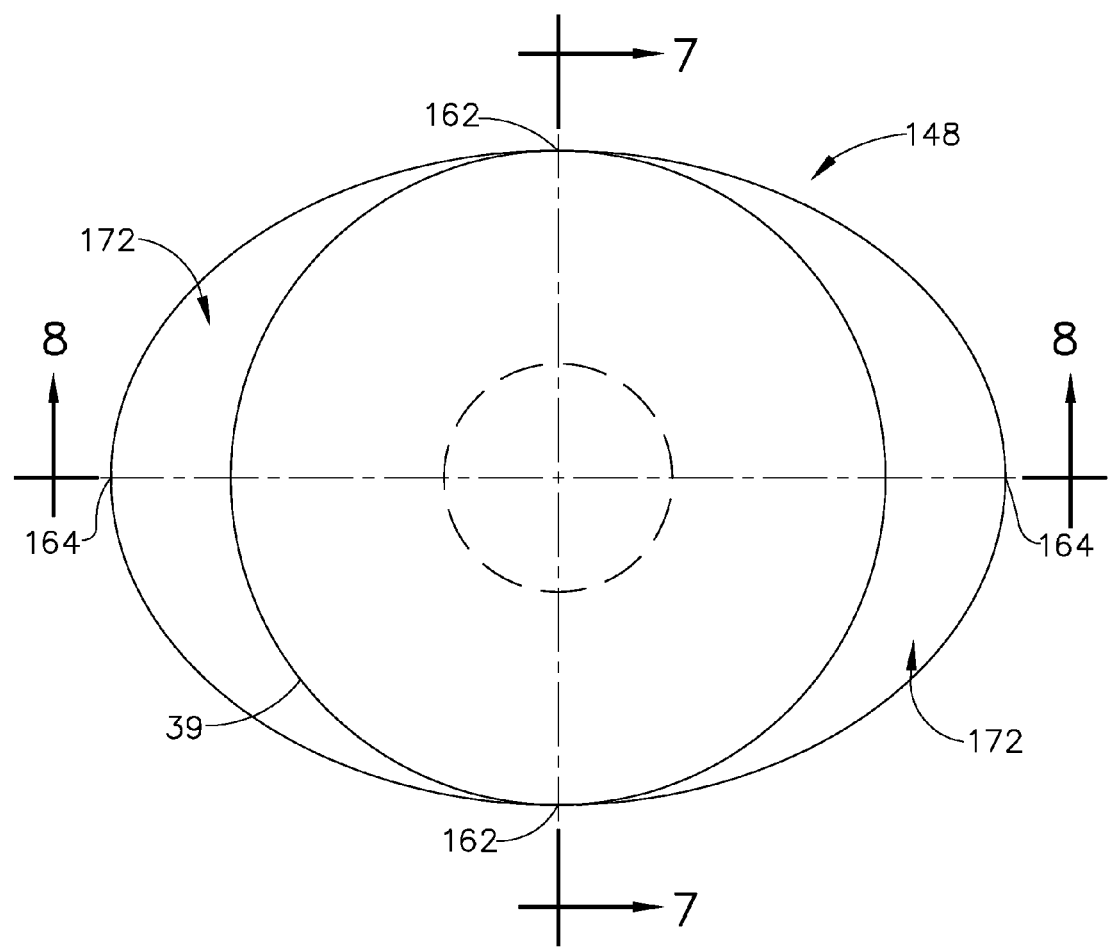
FIG. 6 is a front elevational view of an alternative inlet apparatus.
Figure 7:
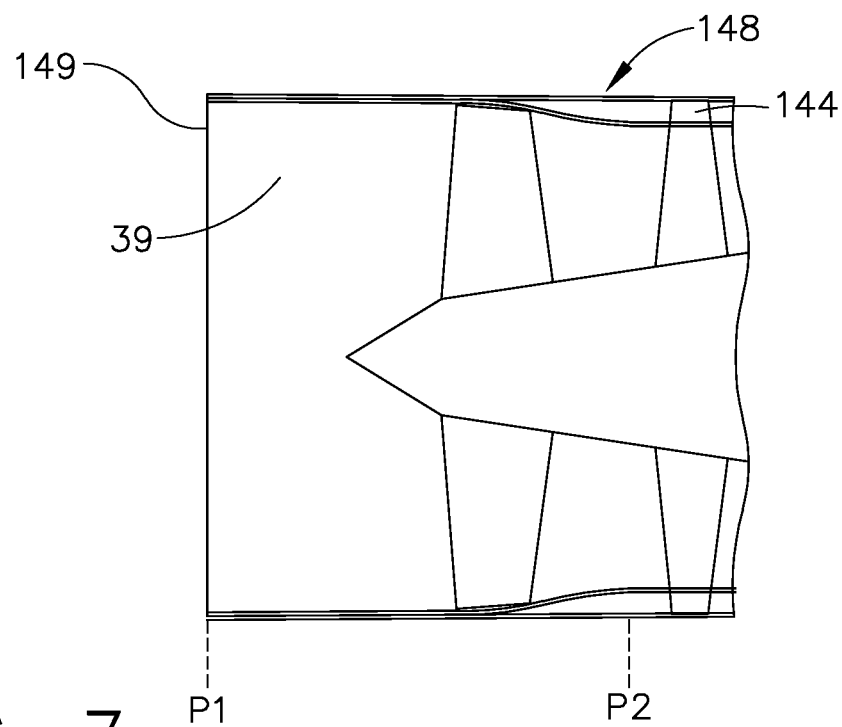
FIG. 7 is a cross-sectional view taken along lines 7-7 of FIG. 6.
Figure 8:
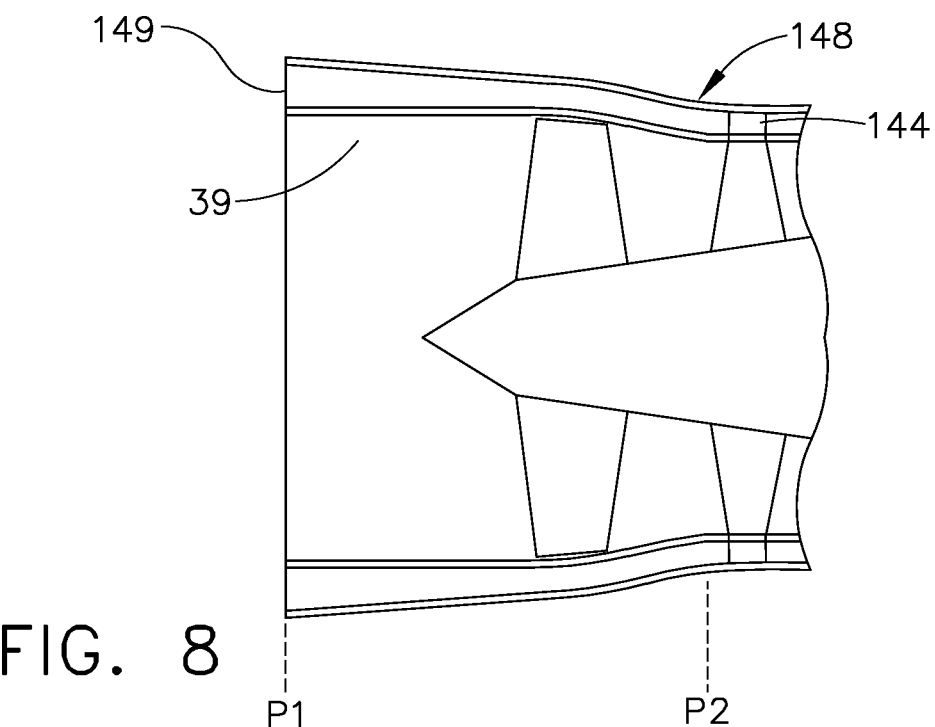
FIG. 8 is a cross-sectional view taken along lines 8-8 of FIG. 6.

FIGS. 6-8 illustrate the forward portion of an alternative outer duct 148 for use with the engine 10. The outer duct 148 is similar in construction to the outer duct 48 described above but has a different shape. It has a forward end 149 that coincides with the first inlet plane P1.

In the example shown in FIGS. 6-8, the outer duct 148 has a frontal area that is generally an ellipse. The vertices 162 of the ellipse's minor axis contact the circular shape of the fan duct 39 at the 12 o'clock and 6 o'clock positions. At those clock positions, the flow area of the forward end 149 of the outer duct 148 is zero. Accordingly, at those clock positions, the flow area of the forward end 149 of the outer duct 148 is zero. The vertices 164 of the ellipse's major axis are spaced away from the exterior of the fan duct 39, such that lobes 172 through which air can flow are defined between the fan duct 39 and the outer duct 148, for example at the 3 o'clock and 9 o'clock positions. As an option, some open area could be provided around the entire periphery of the fan duct 39. In other words, the lobes 172 may be isolated from each other at the first inlet plane P1 or they may be interconnected to each other at the first inlet plane P1.

At the second inlet plane P2, the frontal area of the outer duct 148 is circular in elevation view and closely circumscribes the tips of the FLADE stage 44. Between the first inlet plane P1 and the second inlet plane P2, the outer duct 148 tapers and transitions from the forward end shape to the FLADE inlet shape, or in other words the lobes 172 gradually disappear moving axially front to back, blending into a circular shape so that an annulus is defined between the outer duct 148 and the fan duct 39 at the second inlet plane P2. This tapering is best seen in FIG. 8. It is noted in particular that the transition from noncircular to circular takes place aft of the first inlet plane P1, and also that extra flow area needed for the FLADE stage flow can be provided while holding at least one dimension essentially the same as if the FLADE stage 44 were not present (i.e. the overall engine dimension at the first inlet plane P1 is increased over the fan duct 39 only by the wall thickness of the outer duct 148).

While examples of two specific frontal area shapes at the first inlet plane P1 have been described above, any shape or configuration of the outer duct may be used which defines at least one lobe in cooperation with the fan duct. As an example, a lobe may be defined by using two identical shapes which are nonconcentric to each other (for example two circular areas, one laterally offset from the other). Any number, shape, or arrangement of lobes may be provided at the first inlet plane as needed to suit a particular application.

The inlet duct apparatus described herein has several benefits compared to the prior art. It allows an airframe to take an existing airframe/engine combination which has a fixed height, fixed width mixed flow turbofan ("MFTF") engine passage, and retrofit that MFTF engine with an engine having a FLADE stage of same fan height and width. The FLADE flow can be pulled from the sides or corners of the engine bay and then redirected to a circumferential pattern further aft as the engine carcass begins to neck down.

Alternatively, if a new airframe is being designed, the present invention allows the airframer to reduce the overall size of the vehicle needed in comparison to a traditional cylindrical inlet for given engine flow capacity. Reduced size results in reduced airframe weight, drag, and cost.

The foregoing has described an inlet duct apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A gas turbine engine, comprising:
   a turbomachinery core operable to generate a flow of pressurized combustion gases;
   a low pressure turbomachinery spool operable to be driven by the core and including a fan disposed axially upstream of the core, the fan including at least one row of rotating fan blades;
   a fan duct surrounding the fan blades, the fan duct having a circular area over its entire length, and defining a first inlet plane; and
   a supplemental fan in the form of a ring of airfoils mechanically driven by the fan, and disposed in an outer duct that surrounds the fan duct, wherein the outer duct includes:
      a noncircular first frontal area shape at the first inlet plane which defines, cooperatively with an exterior of the fan duct, at least one lobe through which air can pass into the outer duct; and
      a second frontal area shape at a second inlet plane located axially downstream from the first inlet plane which is circular and which defines, cooperatively with an exterior of the fan duct, an annulus through which air can pass to the supplemental fan.

2. The engine of claim 1 wherein the at least one lobe of the outer duct is a plurality of lobes and the plurality of lobes are isolated from each other at the first inlet plane.

3. The engine of claim 1 wherein the first frontal area shape of the outer duct is in the form a rectangle with linear edges interconnected by convex-curved bends.

4. The engine of claim 1 wherein the first frontal area shape of the outer duct is an ellipse.

5. The engine of claim 1 wherein the outer duct comprises:
   an inlet adapter which defines the first and second frontal area shapes; and
   an aft portion removably coupled to the inlet adapter.

6. The engine of claim 5 wherein the inlet adapter and the aft portion of the outer duct are joined by mating flanges.

* * * * *